(12) United States Patent  (10) Patent No.: US 8,407,320 B2
Shenfield  (45) Date of Patent: Mar. 26, 2013

(54) METHOD AND SYSTEM FOR CORRELATION OF MOBILE CHANNEL SUBSCRIPTION WITH DELIVERY CONTEXT

(75) Inventor: Michael Shenfield, Richmond Hill (CA)

(73) Assignee: Research In Motion Limited, Waterloo (CA)

( * ) Notice: Subject to any disclaimer, the term of this patent is extended or adjusted under 35 U.S.C. 154(b) by 195 days.

(21) Appl. No.: 13/050,280

(22) Filed: Mar. 17, 2011

(65) Prior Publication Data

US 2011/0167137 A1 Jul. 7, 2011

Related U.S. Application Data

(62) Division of application No. 11/678,633, filed on Feb. 26, 2007, now abandoned.

(51) Int. Cl.
*G06F 15/16* (2006.01)
(52) U.S. Cl. ........ 709/219; 709/204; 709/205; 709/203; 709/243; 709/224; 709/231; 709/242; 370/236; 370/406; 370/312; 370/260; 725/116; 725/139; 725/87
(58) Field of Classification Search .................. 709/219, 709/203–205, 243, 224, 231, 242, 227
See application file for complete search history.

(56) References Cited

U.S. PATENT DOCUMENTS

| | | | |
|---|---|---|---|
| 6,714,966 B1 * | 3/2004 | Holt et al. ............... | 709/204 |
| 2001/0013052 A1 * | 8/2001 | Benjamin et al. ......... | 709/203 |
| 2002/0037722 A1 | 3/2002 | Hussain et al. | |
| 2003/0191819 A1 * | 10/2003 | Tran et al. ............... | 709/219 |
| 2004/0225718 A1 | 11/2004 | Heinzel et al. | |
| 2006/0184617 A1 | 8/2006 | Nicholas et al. | |
| 2006/0218226 A1 | 9/2006 | Johnson et al. | |
| 2007/0124789 A1 | 5/2007 | Sachson et al. | |

FOREIGN PATENT DOCUMENTS

| | | |
|---|---|---|
| JP | 2003-174467 | 6/2003 |
| JP | 2004-513540 | 4/2004 |
| KR | 1020060002214 | 1/2006 |
| WO | 0159551 A2 | 8/2001 |
| WO | 0225892 | 3/2002 |

OTHER PUBLICATIONS

Korean Patent Application No. 10-2008-0008525, Office Action dated Oct. 23, 2009.
Chinese Patent Application No. 200810081367.5, First Office Action by State Intellectual Property Office of People's Republic of China (and translation), dated Jan. 8, 2010.
Korean Patent Application No. 10-2008-0008525, Office Action, dated Mar. 12, 2010.
EP07103030, European Search Report dated Aug. 7, 2007.
EP07103030, Examiner's Report (Communication pursuant to Article 94(3) EPC) dated Aug. 4, 2009.
Chinese patent Application No: 200810081367.5, office action dated Jan. 11, 2011.
JP patent application No. 2008-16948, office action dated Nov. 22, 2010.
Australian patent application No. 2008200262, office action dated May 29, 2009.

* cited by examiner

*Primary Examiner* — Jude Jean Gilles
(74) *Attorney, Agent, or Firm* — Moffat & Co.

(57) ABSTRACT

A method and system for establishing a delivery context for channel subscription in a mobile network comprising the steps of: establishing, from a mobile device in the mobile network, a subscription with a content provider; and passing a delivery context to a delivery server.

15 Claims, 7 Drawing Sheets

METHOD AND SYSTEM FOR CORRELATION OF MOBILE CHANNEL SUBSCRIPTION WITH DELIVERY CONTEXT

RELATED APPLICATIONS

The present application is a divisional of U.S. patent application Ser. No. 11/678,633, filed Feb. 26, 2007, the entire contents of which are incorporated herein by reference.

FIELD OF THE DISCLOSURE

The present method and system relates to dynamic content delivery in a mobile environment, and in particular to mechanisms and subscription models for establishing a delivery context for dynamic content.

BACKGROUND

Users of mobile devices or mobile user equipment (UE) are increasingly becoming more sophisticated in terms of the functionality that they require from their mobile devices and the way that they access data from the mobile devices.

Dynamic content delivery allows users to have information or data pushed to them rather than having to go and seek out the data. Examples of data could include stock quotes, weather updates, traffic updates, dynamic wallpaper, ads, applications or other data desirable to a user.

Current technologies for mobile devices such as wireless application protocol (WAP) have the ability to push content. However, WAP requires websites to be rewritten to satisfy the wireless application protocol and provide users with a uniform site that does not change to accommodate a user's capabilities to view a site.

Other alternatives include SMS based push and broadcast or cell broadcast. In the broadcast case, delivery cannot be customized to the needs of a particular user or the capabilities of a particular device. The systems therefore have no intelligence associated with them. A better solution is required for mobile devices.

BRIEF DESCRIPTION OF THE DRAWINGS

The present disclosure will be better understood with reference to the drawings, in which.

DETAILED DESCRIPTION OF THE DRAWINGS

Figure 1:
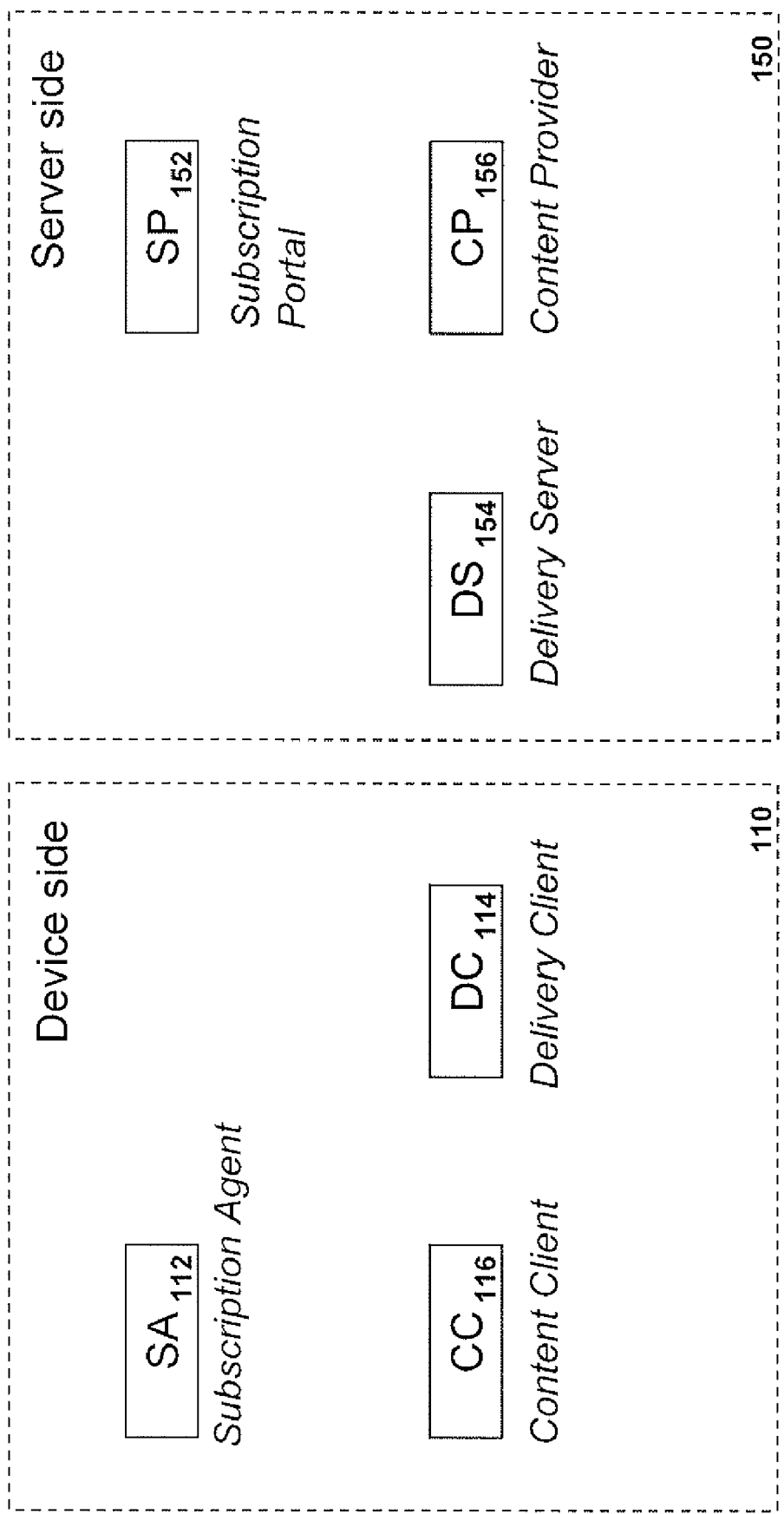
FIG. 1 is a block diagram showing logical elements of a content delivery architecture.

The present disclosure provides for a subscription model and topology in which both subscription information and a delivery context is conveyed to a delivery server or a content provider. Specifically, four topologies are presented. In a first topology, a subscription agent conveys both subscription information and delivery context to a subscription portal. The subscription portal then propagates the delivery context to a delivery server.

In a second topology the content client is aware of delivery context and upon notification of subscription by a subscription agent, the content client propagates the subscription information to a delivery client. The delivery client then sends a delivery context, along with the subscription identifier, to the delivery server.

A third topology includes utilizing a delivery client as a proxy in order to add delivery context information to a subscription. The modified subscription request with the delivery context is then propagated through the subscription portal to the delivery server.

While registration of the content client with a delivery client is an option for all of the above topologies, a prerequisite for a fourth topology is a registration model in which an application and a content provider register with a delivery client and delivery server. The subscription by the content client can then be amended at the delivery client to add a delivery context when requesting a subscription.

In the last topology, a unique channel identifier is generated upon channel registration by content provider. The inclusion of the channel identifier into a "channel guide" provides the content client with a menu for selecting among available content. In a preferred embodiment, such a "channel guide" is provided to the delivery client upon content client registration and include channels matching content client preferences.

In all of the above topologies "personalized channels" can be created. The common channels are channels in which content is uniform for all subscribers. Personalized channels are channels in which content is personalized for a subset of users. An example may be a weather channel in which the common channel is all weather information provided by a the weather service provider and the personalized channel is the weather for a particular postal or zip code. With all of the above topologies, the subscription information can include a subscription filter to establish a sub-channel. The subscription filter can be added to the channel identifier to create a subscription identifier. The subscription identifier can take various forms including a unique identifier, an identifier in which the channel identifier is concatenated with the subscription filter or with a representation of the subscription filter.

The subscription to channels and subscription to "personalized channels" or content subscription can be done in a two-tier subscription model. Specifically, a delivery client and delivery server pair may manage subscriptions at the level of the channel identifier and may know only of the generic channel. The content client and content provider could conversely have knowledge of subscription details including the sub-channel that the content client is subscribed to.

In a further embodiment, sub-channels can be grouped to create "composite" sub-channels or sub-channel bundles. These "composite" sub-channels are virtual channels and a delivery server can create them for wireless efficiency to combine all content into a single delivery bundle to allow efficiencies and delivery of a group of sub-channels.

The present disclosure therefore provides a method for establishing a delivery context for channel subscription in a mobile network comprising the steps of establishing, from a mobile device in the mobile network, a subscription with a content provider; and passing a delivery context to a delivery server.

The present application further provides a system for establishing a delivery context for channel subscription in a mobile network comprising: a device side, the device side having: a subscription agent; a delivery client; and a content client; and a service side, the service side having: a subscription portal, the subscription portal adapted to communicate with the subscription agent to establish a subscription; a delivery server, the delivery server adapted to communicate with the delivery client in accordance with a delivery context; and a content provider, the content provider adapted to provide content requested by the content client.

Reference is now made to FIG. 1. FIG. 1 illustrates logical entities both from the device side 110 and a service side 150.

On the device side 110, logical entities include a subscription agent 112, a delivery client 114 and a content client 116.

As will be appreciated by those skilled in the art, when discussing dynamic content delivery, a content provider needs to know how to deliver information and what information to deliver. A subscription between a device and a content provider defines a delivery context including how and what to deliver. Thus, an association exists between a subscription context and a delivery context.

A subscription agent 112 provides details of the subscription. In one example, a subscription agent can be a browser on the mobile device. However, this is not meant to be limiting and the subscription agent can be part of various applications.

A delivery client 114 is preferably a client application on a mobile device and can communicate the delivery context to the server side, as described below.

A content client 116 is also an application on the device side and is adapted to receive the requested content based on the subscription. Examples include a video player, a stock ticker or any tool adapted to receive content and process it somehow.

As will be appreciated by those skilled in the art, subscription agent 112, delivery client 114 and content client 116 are logical entities. These entities can be combined into one or more applications and a mobile device will not necessarily have to have all three as separate elements.

Server side 150 includes a subscription portal 152, a delivery server 154 and a content provider 156.

Subscription portal 152 is adapted to establish a subscription with a subscription agent 112.

Content provider 156 provides the content that a mobile device content client 116 desires.

Delivery server 154 utilizes a delivery context to provide the information from content provider 156 to a mobile device.

Again, the entities on server side 150, specifically subscription portal 152, content provider 156 and delivery server 154, are logical entities and may exist separately or together. Further, these entities do not need to necessarily exist on the same device and could be spread over various nodes of the network.

Figure 2:
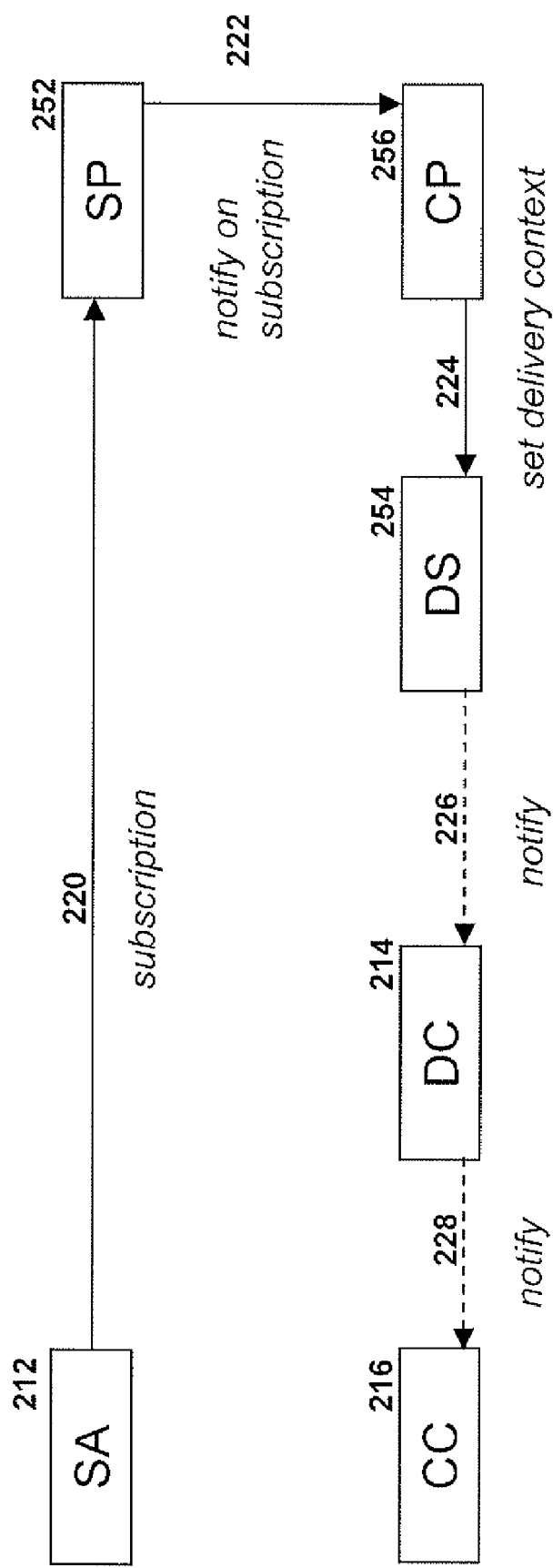
FIG. 2 is a block diagram showing message flow for establishing a delivery context between the logical elements of FIG. 1.

Reference is now made to FIG. 2. FIG. 2 illustrates a flow chart of the various logical entities from FIG. 1 interacting to set up a subscription channel.

In the embodiment of FIG. 2, subscription agent 212 has information about a subscription. This could include the channel Uniform Resource Identifier (URI), a subscription filter, among others. Subscription agent 212 further includes a delivery context. As will be appreciated, the delivery context could include user and device identities, account information, preferred radio bearers, device capabilities, or other information that a delivery server needs to know in order to deliver content to a device.

In message 220, subscription agent 212 provides the subscription information and the delivery context to a subscription portal 252. The subscription portal 252 could, for example, include a website that subscription agent 212 communicates with. Those skilled in the art would know other examples of a subscription portal.

When subscription portal 252 receives a subscription message 220, it receives both the subscription information and the delivery context.

In the embodiment of FIG. 2, subscription portal 252 notifies, in message 222, the content provider 256 of the subscription. Message 222 is a proprietary message between subscription portal 252 and content provider 256.

Once content provider 256 receives the subscription information, including delivery context, it then sends the delivery context in message 224 to delivery server 254. In a preferred embodiment, the content provider 256 creates an external subscription identifier and, if available, sends this identifier along with the delivery context. If a delivery context is not available, information sufficient to create a delivery context at the delivery server 254 is sent. Such information could include, for example, a mobile account number, an international mobile equipment identifier (IMEI), e-mail address, among others.

In one embodiment, a subscription identifier created by content provider 256 is unique for a mobile device. In an alternative context, the subscription identifier could be shared by multiple devices using the same sub-channel or "personalized channel", as described in more detail below.

Delivery server 254 could then optionally provide a notification to delivery client 214 in message 226, and delivery client 214 could then optionally notify content client 216 using a message 228. Messages 226 and 228 may be required if content delivery is poll based. Thus, if content retrieval is based on a schedule, on demand, upon content availability notifications among others, then the notifications in messages 226 and 228 could be sent in order to setup content retrieval rules.

Alternatively, if additional actions associated with the subscription are necessary, the notifications in steps 226 and 228 could also be sent. Such actions could include the registration of the content client upon subscription, content filtering on delivery client 214, among others.

In one embodiment, notifications 226 and 228 include a channel identifier to identify the channel for information retrieval from the delivery server 254.

The above therefore provides for the establishment of an external subscription where the server provides client subscriber context notification.

Figure 3:
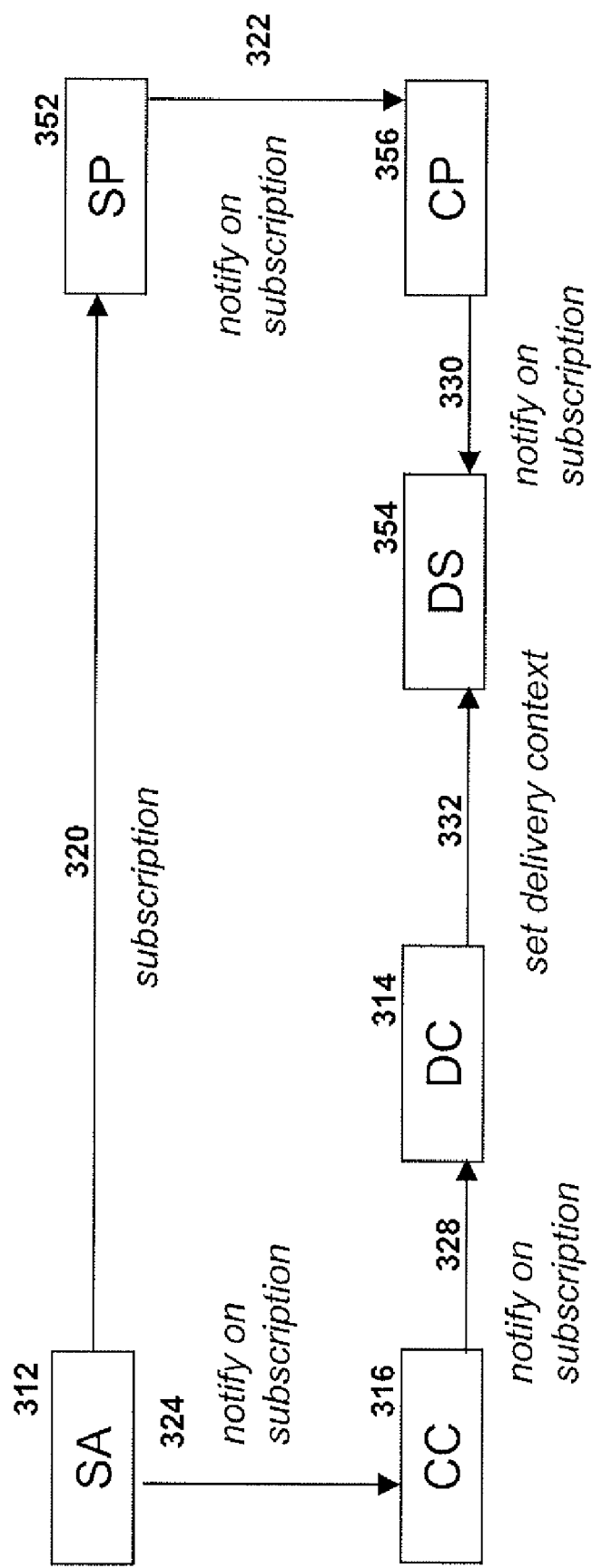
FIG. 3 is a block diagram showing an alternative message flow for establishing a delivery context between the logical elements of FIG. 1.

Reference is now made to FIG. 3. FIG. 3 shows block diagram of message flow between the logical elements of FIG. 1 in which a content client sets up delivery context.

A subscription agent 312 provides, in message 320, subscription portal 352 with subscription information. Message 320 includes subscription information such as a channel universal resource indicator, subscription filters, among others, but unlike message 220 from FIG. 2, message 320 does not include a delivery context.

A returned subscription identifier is provided by either the subscription portal 352 or the content provider 356 in a message (not shown).

Upon receipt of subscription information, subscription portal 352 communicates with content provider 356 through a message 322. Message 322 is a proprietary message and notifies content provider 356 of the subscription. In the case where the content provider is creating the subscription identifier, the content provider 356 will then provide the subscription identifier back to subscription agent 312.

Subscription agent 312 is also aware of content client 316 and, upon receiving a subscription identifier, it can notify the content client 316 directly. In one example, this could involve providing a channel identifier for the subscription to content client 316.

Once content client 316 receives proprietary message 324, including subscription information, it then notifies, in message 328 the delivery client 314 of the subscription identifier. Similarly, content provider 356 notifies delivery server 354 of the subscription identifier in message 330.

Once delivery client 314 has subscription information, it also knows information that needs to be sent to the delivery server 354 in order to set up a delivery context. Message 332 is sent from delivery client 314 to delivery server 354 to set the delivery context. The delivery context message can include the subscription identifier. Delivery server 354 may return a channel identifier to identify the channel for content retrieval. As will be appreciated, delivery server 354 may need to combine information from delivery client 314 and content provider 356 to provide the return information to delivery client 314.

The above therefore provides for an external subscription in which a delivery context is set up by the content client 316.

Figure 4:
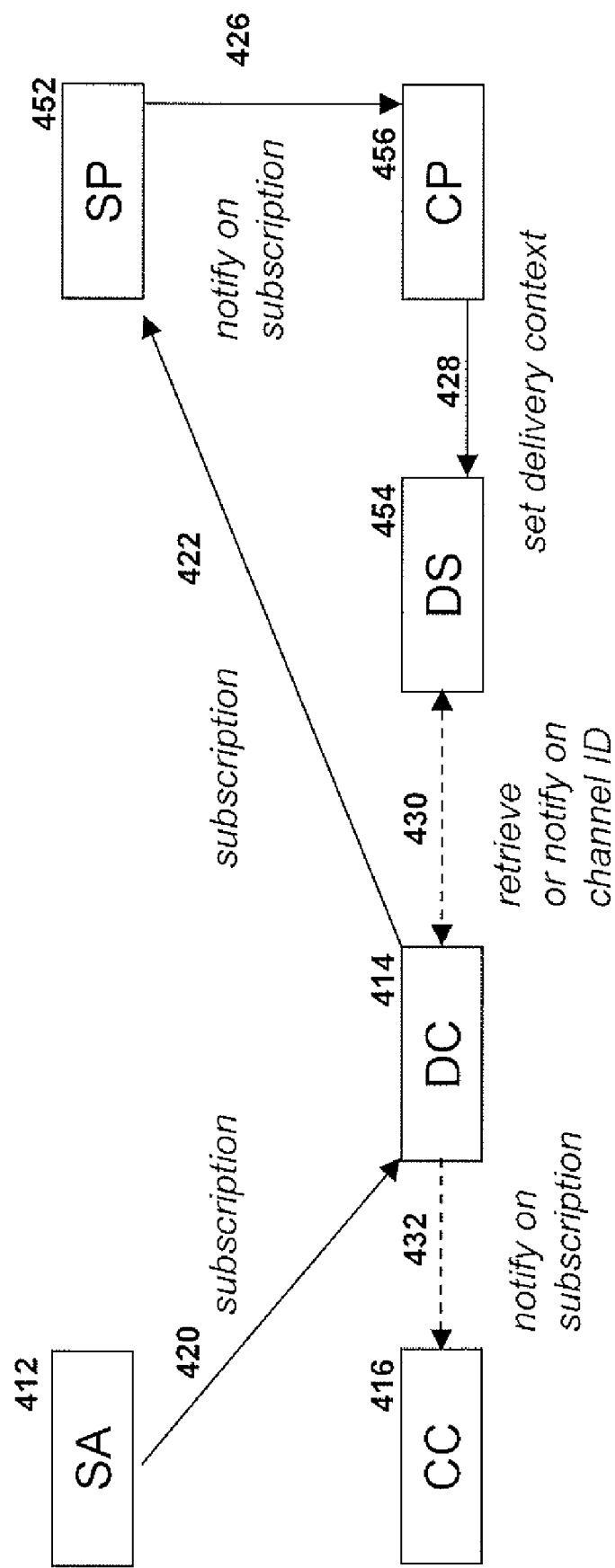
FIG. 4 is a block diagram showing an alternative message flow for establishing a delivery context between the logical elements of FIG. 1.

Reference is now made to FIG. 4. FIG. 4 illustrates a flow chart of the various logical elements of FIG. 1 where an external subscription is created through a delivery client 414 using the delivery client 414 as a proxy.

In the example of FIG. 4, a subscription agent 412 communicates subscription information such as a channel URI, subscription filter, among others in subscription message 420. A service provider URL is also included.

As indicated with reference to FIG. 4, message 420 is passed between subscription agent 412 and delivery client 414. Subscription agent, however, may not be aware of the delivery client 414 as a proxy and may merely be attempting to establish a subscription with a subscription portal 452.

The proxy is used for all messages that are being passed from the mobile device and the proxy can be used to insert information in order to assist in the request.

Once delivery client 414 receives the subscription message 420, it can insert delivery context information into the subscription message and then pass the subscription message to subscription portal 452 in a message 422. A subscription ID may then be returned by either the subscription portal or a content provider 456 in a message (not shown).

Upon subscription, delivery client 414 may optionally notify a content client 416 of the subscription in message 432. In one embodiment, if the content client 416 is registered with the delivery server 454 prior to the subscription, a subscription may trigger a registration process.

On the server side, once the subscription portal 452 receives subscription information, including delivery context, from delivery client 414, it then, in message 426, notifies content provider 456 of the subscription identifier and the delivery context. Message 426 is preferably a proprietary message between subscription portal 452 and content provider 456.

Content provider 456 then can set up delivery context with delivery server 454 through a message 428.

If subscription portal 452 does not return a channel identifier to the delivery client 414 in response to a message 422, the delivery server 454 may optionally return the channel identifier to delivery client 414 in message 430. Alternatively, it could notify the delivery client on that channel identifier.

The above therefore utilizes the delivery client as a proxy, such as a web proxy, in order to intercept subscription messages and insert information including delivery context information to be passed to the subscription portal. As will be appreciated, this could be used in situations where the subscription agent 412 does not know delivery context information and thus a proxy is needed to provide this information to the subscription portal 452.

Figure 5:
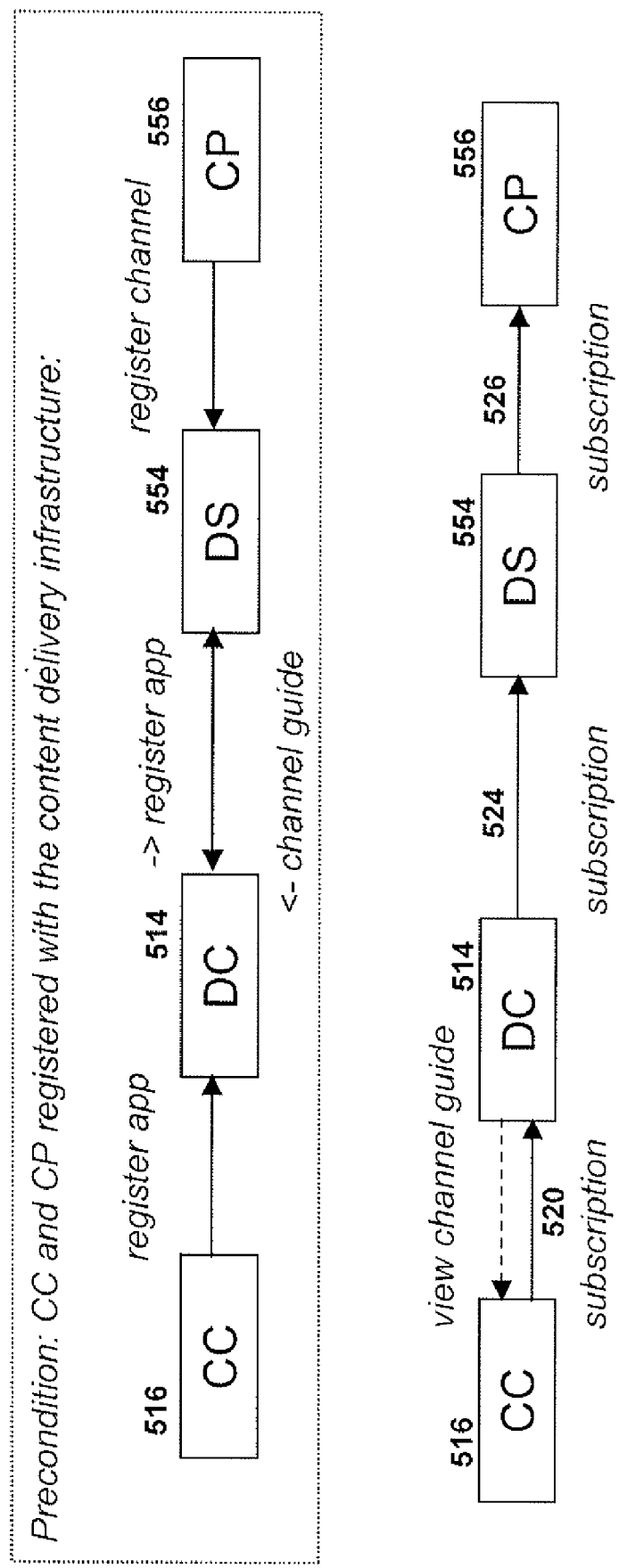
FIG. 5 is a block diagram showing an alternative message flow for establishing a delivery context between the logical elements of FIG. 1.

Reference is now made to FIG. 5. FIG. 5 is a flow diagram showing subscription channel set up in an infrastructure where registration between a content client and a content provider is performed. Specifically, as illustrated in FIG. 5, a precondition to subscription channel set up is the registration of a content client 516 with a delivery client 514 and a content provider 556 with a delivery server 554. The information is then exchanged between delivery server 554 and delivery client 514. Specifically, delivery client 514 passes registered applications to delivery server 554 and delivery server 554 passes a channel guide to delivery client 514. The channel guide includes channels that the content client may wish to subscribe to. As will be appreciated by those skilled in the art, the channel guide may be returned by delivery server 554 in response to registration of the content client 516 and may be constructed to include channels matching content client 516 preferences Referring to FIG. 5, when a content client 516 wishes to subscribe to a specific channel, a channel guide is provided to content client 516 in which a channel can be selected. The subscription for the selected channel is passed in message 520 to delivery client 514. This subscription is then passed to delivery server 554 in message 524. The delivery server then forwards this message to the content provider 556 in a message 526.

As will be appreciated, subscription message 524 can contain the delivery context thereby enabling the content provider 556 to pass the requested information in a requested manner.

In the above, the subscription identifier includes a channel name, URI identifier, delivery preferences, such as the schedule, and/or a user identity. All of this information is used to identify "a common channel". As used herein, common channel is used to indicate that all subscribers to the content provider will receive the same information on that channel. For example, a finance news channel, a TV network channel, a podcast channel, a jazz channel, among others.

Conversely, a "personalized channel" could be used to provide a user with personalized information. Specifically, if a user is interested only in a subset of the information that is provided on a "common channel", this could be provided in a "personalized channel". For example, a weather provider may provide weather information for all of North America. A personalized channel for the weather may be to provide weather information for a particular postal or zip code. Further, a user may be only interested in receiving quotes for the stocks of company he or she owns or is watching and therefore may specify a particular subset of all of the stock news and quotes available. A user may request only a subset of television programs available on a TV network channel. Other examples of "personalized channels" would be known to those in the art.

As indicated with reference to FIGS. 2, 3, 4 and 5, subscription information can include a subscription filter to establish a sub-channel. Thus, for example, a stock quote channel with the channel ID "12345" could be passed on, along with the subscription filter for a specific stock; for example, "symbol=ABCD". The result of this is that a sub-channel for company ABCD could be passed. The resulting subscription identifier could be a unique identifier for the combination of the channel identifier and subscription filter, for example "1AD543F" or could be formed with a predefined schema such as "12345X001", or "12345#ABCD", among others.

When utilizing personalized channels, the use of the term "channel identifier" is used to identify the "parent" common channel for the sub-channel. The subscription identifier identifies the sub-channel, and as indicated above, could be a unique identifier for the channel identifier with the subscription filter or it could be a concatenation of the channel identifier and the subscription filter or any other predefined schema.

A personalized channel can be established in various ways. A first method for establishing a personalized channel is to use the set-up illustrated in FIG. 2, 3, 5 or 6, where the subscription information includes both the channel identifier and a subscription identifier.

In a preferred embodiment, a two-tier model may be used, where the delivery client and delivery server pair may manage subscriptions on the level of the channel identifier. In other words, the delivery client and the delivery server only know about the generic channel.

The content client and content provider conversely have knowledge of specific subscription details such as the subscription filter. The knowledge of the subscription filter is shielded from the delivery client and delivery server. This is best illustrated with an example.

A subscription to a weather channel called "weather.com" is established through one of the flows presented in FIGS. 2 to 5. This includes a channel identifier to identify the weather service.

The delivery client and delivery server know that the content client is subscribed to the channel identifier "weather.com".

Only the content client and content provider (and possibly the subscription agent and subscription portal) know that the content client is subscribed for weather for the zip code "10016".

The content provider may issue a subscription identifier such as "weather#10016", and associate the sub-channel with devices or users subscribed to the zip code. In order to provide the information to content clients, the content provider has two options.

A first option is to notify the delivery server on a user or device sub-channel. Specifically, the weather service will notify the delivery server on the "weather#0016" sub-channel. In this case, there is no need to manage users at the content provider and all that is needed is to publish updated forecasts in the delivery server, specifying a subscription ID for that weather forecast.

A second option is to keep information about sub-channels internally at the content provider and to manage the user device subscriptions outside of the delivery server. The delivery server knows about user subscriptions for channel identifier "weather" in order to engage billing and account validation. However, in this case, the content provider has to publish an updated forecast at the delivery server along with a list of users who need to receive the forecast. As will be appreciated, this second option is not as scalable as the first option.

Figure 6:
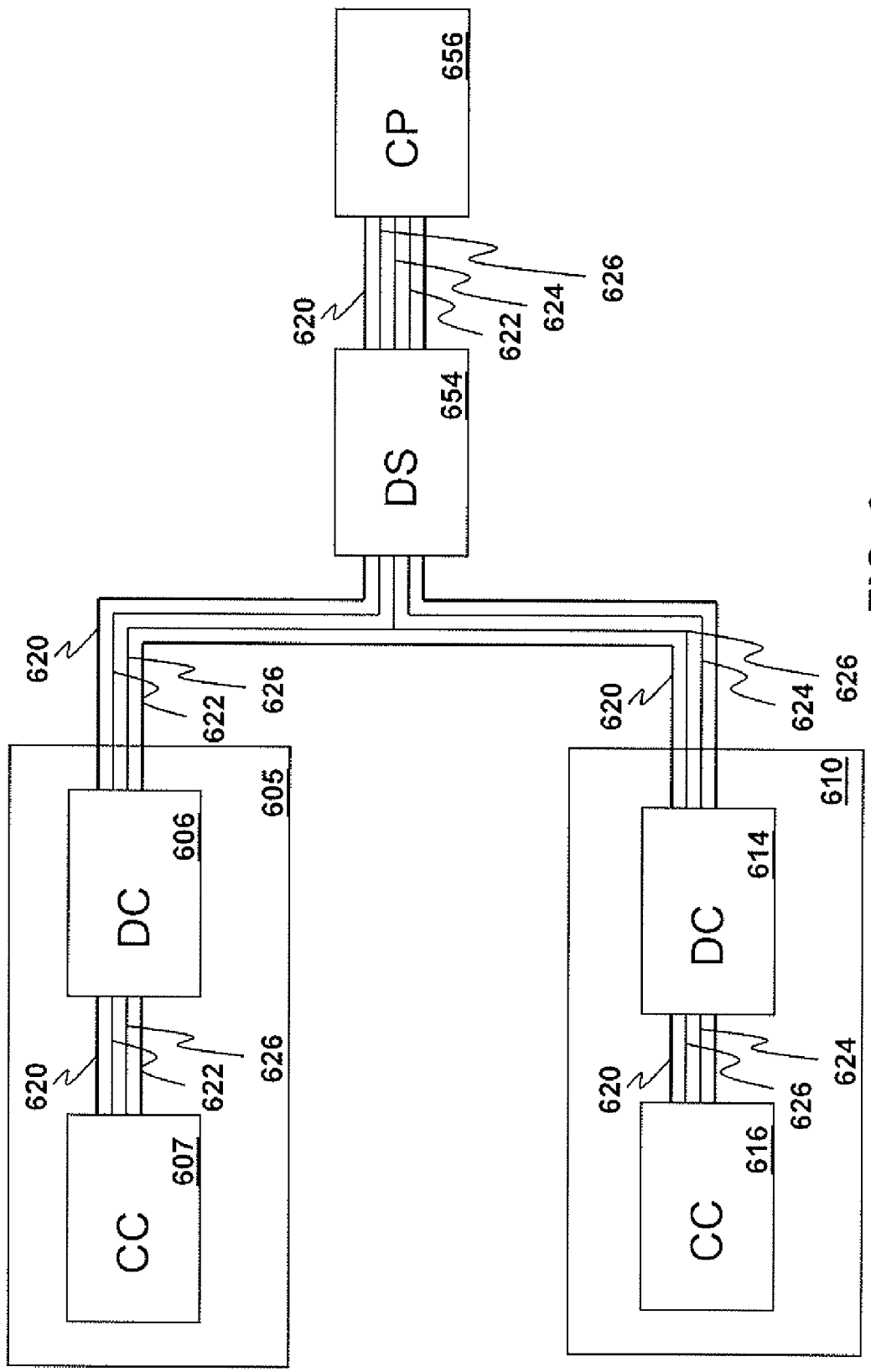
FIG. 6 is a block diagram showing channel subscription and content subscription flow between elements of a content delivery architecture.

The above is further illustrated with reference to FIG. 6. FIG. 6 shows a content provider 656 that communicates with a delivery server 654. A channel subscription 620 is established based on a channel identifier. Channel subscription 620 is the equivalent of a "common channel" from above.

As illustrated in FIG. 6, content subscription 622, content subscription 624 and content subscription 626 are all passed between content provider 656 and 654. Content subscription 622, 624 and 626 are each personalized channels from above.

Delivery server 654 communicates with two devices 605 and 610, who have a delivery client 606 and 614 respectively.

In communicating with delivery client 606, the channel subscription 620 is passed. However, in this case, content client 607 of device 605 only requires content subscriptions 622 and 626, and these are therefore only passed to delivery client 606 and ultimately to content client 607.

Conversely, device 610 includes a content client 616 and a delivery client 614. Content client 616 only requires content subscriptions 624 and 626 and these are passed from delivery server 654 to content client 616 through delivery client 614.

Thus, using a two-tier approach, delivery server 654 and delivery clients 606 and 614 know only that mobile devices 605 and 610 have subscribed to channel 620. Conversely, content clients 607 and 616, along with content provider 656 know that mobile device 610 and mobile device 605 require specific content subscriptions. In this case, mobile device wants content subscriptions 622 and 626, whereas mobile device 610 wants content subscription 624 and 626.

Alternatively, the delivery server 654 may know about this information as well if it is sorting which sub-channels or content subscriptions to send.

A further expansion of the above is to create composite sub-channels or sub-channel bundles at the delivery server. The composite sub-channels are "virtual channels" and the delivery server creates them for wireless efficiency to combine into a single delivery bundle the content for a group of sub-channels of the same parent channel. For example, a user may wish to receive certain stock quotes. Specifically, the user wishes to receive stock quotes for companies ABCD, BCDE and CDEF. Other users may also require the combination of these three stock quotes and the delivery server could therefore bundle the stock quotes into a sub-channel. Utilizing the exemplary channel identifier and subscription identifier from above, the bundle could look like "12345#ABCD&BCDE&CDEF". When passing the bundled sub-channel, stock quotes for all three of the stocks are passed in a single content bundle.

As will be appreciated, alternatives to this include a subscription ID for each user. This solution is however unscaleable and adding users creates extra burden on the delivery server and the content provider.

A further alternative is to use a sub-channel for each subset of information and a list of users that require the sub-channel. As will be appreciated, bundling the information that is required across multiple users provides efficiencies compared to this.

Figure 7:
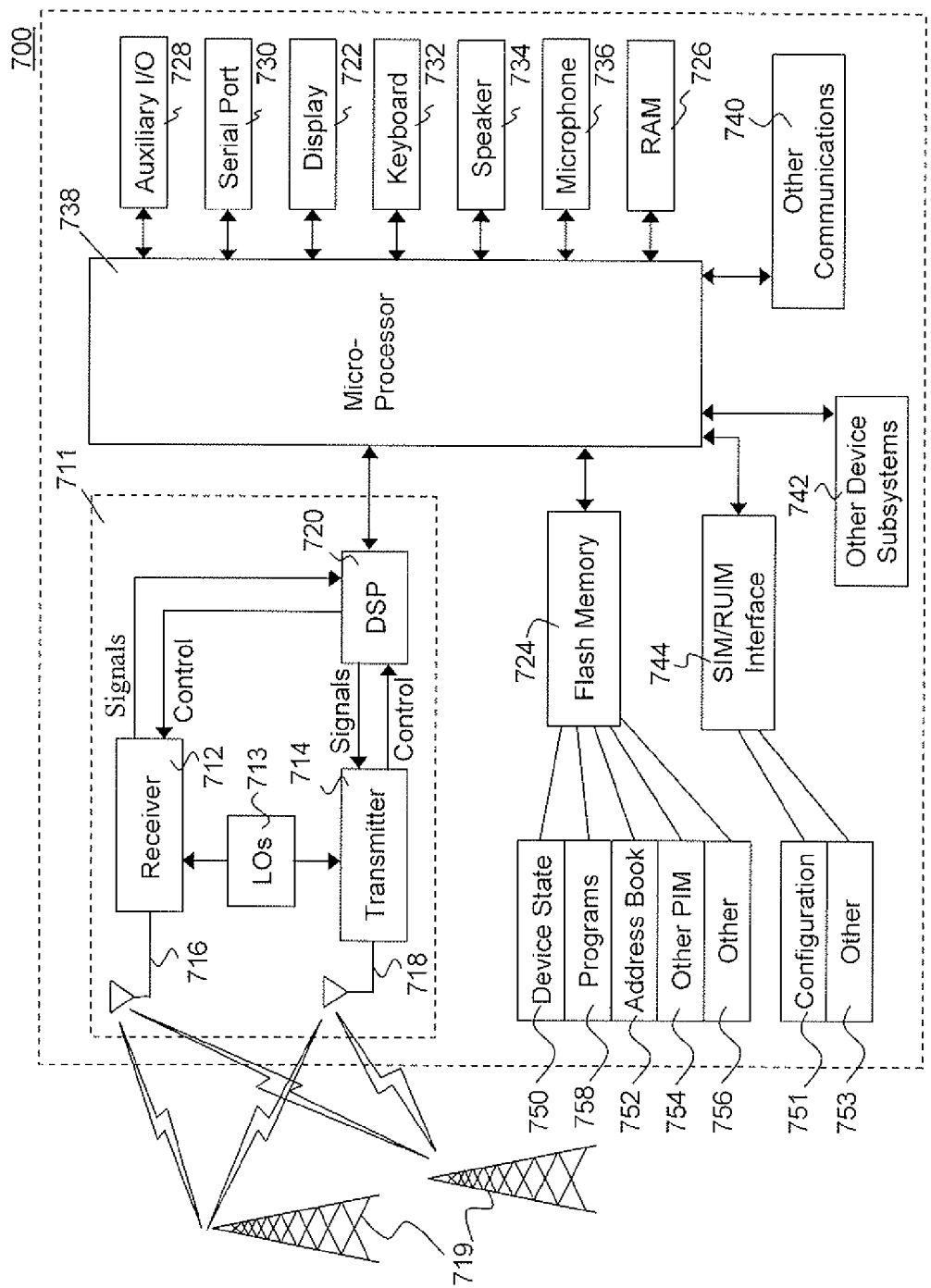
FIG. 7 is a block diagram showing an exemplary mobile device.

While the above can be implemented on a variety of mobile devices, an example of one mobile device is outlined below with respect to FIG. 7. Reference is now made to FIG. 7.

Mobile device 700 is preferably a two-way wireless communication device having at least voice and data communication capabilities. Mobile device 700 preferably has the capability to communicate with other computer systems on the Internet. Depending on the exact functionality provided, the mobile device may be referred to as a data messaging device, a two-way pager, a wireless e-mail device, a cellular telephone with data messaging capabilities, a wireless Internet appliance, or a data communication device, as examples.

Where mobile device 700 is enabled for two-way communication, it will incorporate a communication subsystem 711, including both a receiver 712 and a transmitter 714, as well as associated components such as one or more, preferably embedded or internal, antenna elements 716 and 718, local oscillators (LOs) 713, and a processing module such as a digital signal processor (DSP) 720. As will be apparent to those skilled in the field of communications, the particular design of the communication subsystem 711 will be dependent upon the communication network in which the device is intended to operate. For example, mobile device 700 may include a communication subsystem 711 designed to operate within the GPRS network or UMTS network.

Network access requirements will also vary depending upon the type of network 719. For example, In UMTS and GPRS networks, network access is associated with a subscriber or user of mobile device 700. For example, a GPRS mobile device therefore requires a subscriber identity module (SIM) card in order to operate on a GPRS network. In UMTS a USIM or SIM module is required. In CDMA a RUIM card or module is required. These will be referred to as a UIM interface herein. Without a valid UIM interface, a mobile device may not be fully functional. Local or non-network communication functions, as well as legally required functions (if any) such as emergency calling, may be available, but mobile device 700 will be unable to carry out any other functions involving communications over the network 719. The UIM interface 744 is normally similar to a card-slot into which a card can be inserted and ejected like a diskette or PCMCIA card. The UIM card can have approximately 64K of memory and hold many key configuration 751, and other information 753 such as identification, and subscriber related information.

When required network registration or activation procedures have been completed, mobile device 700 may send and receive communication signals over the network 719. Signals received by antenna 716 through communication network 719 are input to receiver 712, which may perform such common receiver functions as signal amplification, frequency down conversion, filtering, channel selection and the like, and in the example system shown in FIG. 7, analog to digital (A/D) conversion. A/D conversion of a received signal allows more complex communication functions such as demodulation and decoding to be performed in the DSP 720. In a similar manner, signals to be transmitted are processed, including modulation and encoding for example, by DSP 720 and input to transmitter 714 for digital to analog conversion, frequency up conversion, filtering, amplification and transmission over the communication network 719 via antenna 718. DSP 720 not only processes communication signals, but also provides for receiver and transmitter control. For example, the gains applied to communication signals in receiver 712 and transmitter 714 may be adaptively controlled through automatic gain control algorithms implemented in DSP 720.

Network 719 may further communicate with multiple systems, including a server and other elements (not shown). For example, network 719 may communicate with both an enterprise system and a web client system in order to accommodate various clients with various service levels.

Mobile device 700 preferably includes a microprocessor 738 which controls the overall operation of the device. Communication functions, including at least data communications, are performed through communication subsystem 711. Microprocessor 738 also interacts with further device subsystems such as the display 722, flash memory 724, random access memory (RAM) 726, auxiliary input/output (I/O) subsystems 728, serial port 730, keyboard 732, speaker 734, microphone 736, a short-range communications subsystem 740 and any other device subsystems generally designated as 742.

Some of the subsystems shown in FIG. 7 perform communication-related functions, whereas other subsystems may provide "resident" or on-device functions. Notably, some subsystems, such as keyboard 732 and display 722, for example, may be used for both communication-related functions, such as entering a text message for transmission over a communication network, and device-resident functions such as a calculator or task list.

Operating system software used by the microprocessor 738 is preferably stored in a persistent store such as flash memory 724, which may instead be a read-only memory (ROM) or similar storage element (not shown). Those skilled in the art will appreciate that the operating system, specific device applications, or parts thereof, may be temporarily loaded into a volatile memory such as RAM 726. Received communication signals may also be stored in RAM 726. Further, a unique identifier is also preferably stored in read-only memory.

As shown, flash memory 724 can be segregated into different areas for both computer programs 758 and program data storage 750, 752, 754 and 756. These different storage types indicate that each program can allocate a portion of flash memory 724 for their own data storage requirements. Microprocessor 738, in addition to its operating system functions, preferably enables execution of software applications on the mobile device. A predetermined set of applications that control basic operations, including at least data and voice communication applications for example, will normally be installed on mobile device 700 during manufacturing. A preferred software application may be a personal information manager (PIM) application having the ability to organize and manage data items relating to the user of the mobile device such as, but not limited to, e-mail, calendar events, voice mails, appointments, and task items. Naturally, one or more memory stores would be available on the mobile device to facilitate storage of PIM data items. Such PIM application would preferably have the ability to send and receive data items, via the wireless network 719. In a preferred embodiment, the PIM data items are seamlessly integrated, synchronized and updated, via the wireless network 719, with the mobile device user's corresponding data items stored or associated with a host computer system. Further applications may also be loaded onto the mobile device 700 through the network 719, an auxiliary I/O subsystem 728, serial port 730, short-range communications subsystem 740 or any other suitable subsystem 742, and installed by a user in the RAM 726 or preferably a non-volatile store (not shown) for execution by the microprocessor 738. Such flexibility in application installation increases the functionality of the device and may provide enhanced on-device functions, communication-related functions, or both. For example, secure communication applications may enable electronic commerce functions and other such financial transactions to be performed using the mobile device 700. These applications will however, according to the above, in many cases need to be approved by a carrier.

In a data communication mode, a received signal such as a text message or web page download will be processed by the communication subsystem 711 and input to the microprocessor 738, which preferably further processes the received signal for output to the display 722, or alternatively to an auxiliary I/O device 728. A user of mobile device 700 may also compose data items such as email messages for example, using the keyboard 732, which is preferably a complete alphanumeric keyboard or telephone-type keypad, in conjunction with the display 722 and possibly an auxiliary I/O device 728. Such composed items may then be transmitted over a communication network through the communication subsystem 711.

For voice communications, overall operation of mobile device 700 is similar, except that received signals would preferably be output to a speaker 734 and signals for transmission would be generated by a microphone 736. Alternative voice or audio I/O subsystems, such as a voice message recording subsystem, may also be implemented on mobile device 700. Although voice or audio signal output is preferably accomplished primarily through the speaker 734, display 722 may also be used to provide an indication of the identity of a calling party, the duration of a voice call, or other voice call related information for example.

Serial port 730 in FIG. 7 would normally be implemented in a personal digital assistant (PDA)-type mobile device for which synchronization with a user's desktop computer (not shown) may be desirable. Such a port 730 would enable a user to set preferences through an external device or software application and would extend the capabilities of mobile device 700 by providing for information or software downloads to mobile device 700 other than through a wireless communication network. The alternate download path may for example be used to load an encryption key onto the device through a direct and thus reliable and trusted connection to thereby enable secure device communication.

Alternatively, serial port 730 could be used for other communications, and could include as a universal serial bus (USB) port. An interface is associated with serial port 730.

Other communications subsystems 740, such as a short-range communications subsystem, is a further optional component which may provide for communication between mobile device 700 and different systems or devices, which need not necessarily be similar devices. For example, the subsystem 740 may include an infrared device and associated circuits and components or a Bluetooth™ communication module to provide for communication with similarly enabled systems and devices.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A mobile device comprising:
a processor configured to execute a delivery client for receiving a first message from a delivery server, the first message containing a channel identifier and notifying the delivery client about a subscription initiated with a subscription portal,
wherein the processor is further configured to execute the delivery client for sending, to a content application on the mobile device, a second message for notifying the content application about the subscription, the second message being different from the first message and including the channel identifier.

2. The mobile device of claim 1 wherein the channel identifier identifies a channel for the delivery client to use for obtaining content relative to the subscription.

3. The mobile device of claim 1 wherein the subscription portal is a website.

4. The mobile device of claim 3 wherein the processor is further configured to execute a browser application for establishing the subscription with the website.

5. The mobile device of claim 4 wherein the browser application is configured to provide information to the website, the information including at least one of a user identity, a device identity, account information, a preferred radio bearer, and device capabilities.

6. A method performed by a mobile device, the method comprising:
receiving a first message from a delivery server, the first message containing a channel identifier and notifying a delivery client on the mobile device about a subscription initiated with a subscription portal; and
sending, from the delivery client to a content application on the mobile device, a second message for notifying the content application about the subscription, the second message being different from the first message and including the channel identifier.

7. The method of claim 6 wherein the channel identifier identifies a channel for the delivery client to use for obtaining content relative to the subscription.

8. The method of claim 6 wherein the subscription portal is a website.

9. The method of claim 8 further comprising:
using a browser application on the mobile device for establishing the subscription with the website.

10. The method of claim 9 wherein using the browser application comprises providing information to the website, the information including at least one of a user identity, a device identity, account information, a preferred radio bearer, and device capabilities.

11. A non-transitory storage medium carrying computer-readable instructions which when executed by a processor cause an apparatus to perform the operations of:
receiving a first message from a delivery server, the first message containing a channel identifier and notifying a delivery client on the mobile device about a subscription initiated with a subscription portal; and
sending, from the delivery client to a content application on the mobile device, a second message for notifying the content application about the subscription, the second message being different from the first message and including the channel identifier.

12. The non-transitory storage medium of claim 11 wherein the channel identifier identifies a channel for the delivery client to use for obtaining content relative to the subscription.

13. The non-transitory storage medium of claim 11 wherein the subscription portal is a website.

14. The non-transitory storage medium of claim 13 wherein the computer-readable instructions are further configured, when executed by a processor, to cause:
using a browser application on the mobile device for establishing the subscription with the website.

15. The non-transitory storage medium of claim 14 wherein using the browser application comprises providing information to the website, the information including at least one of a user identity, a device identity, account information, a preferred radio bearer, and device capabilities.

* * * * *